United States Patent [19]
Fristad et al.

[11] Patent Number: 5,466,426
[45] Date of Patent: Nov. 14, 1995

[54] METHOD AND APPARATUS FOR REMOVING METAL CONTAMINATION FROM SOIL

[75] Inventors: William E. Fristad; Jeffrey L. Narum; Phillip L. Mattison; Michael J. Virnig, all of Santa Rosa, Calif.; John Fast, Littleton, Colo.

[73] Assignee: Cognis, Inc., Santa Rosa, Calif.

[21] Appl. No.: 104,979

[22] Filed: Aug. 11, 1993

[51] Int. Cl.$^6$ .................................................. C22B 11/00
[52] U.S. Cl. .............................................. 423/98; 75/725
[58] Field of Search .................................. 423/98; 75/725

[56] References Cited

U.S. PATENT DOCUMENTS

| | | | |
|---|---|---|---|
| 1,480,110 | 1/1924 | Platten | 75/725 |
| 4,060,410 | 11/1977 | Laszlo | 75/725 |
| 4,372,782 | 2/1983 | Salter et al. | 423/98 |
| 4,784,757 | 11/1988 | Nelson et al. | 209/159 |
| 4,888,053 | 12/1989 | Grayson et al. | 423/109 |
| 5,342,449 | 8/1994 | Holbein et al. | 423/98 |

FOREIGN PATENT DOCUMENTS

| | | |
|---|---|---|
| 278328 | 8/1988 | European Pat. Off. . |
| 402737 | 12/1990 | European Pat. Off. . |
| 2495640 | 6/1982 | France ..................................... 75/725 |

OTHER PUBLICATIONS

Sauerbeck, et al, "Soil–Chemical Evaluation of Different . . . . Soils" Comm. Eur. Communities, (Rep.) EUR 1983, no month, EUR 8022, Environ. Eff. Org. Inorg. Contam. Sewage Sludge, 1983, pp. 147–160.

Chemiker–Zeitung, 106, Jahrgang (1982); pp. 289–292 (abstract).

*Primary Examiner*—Steven Bos
*Attorney, Agent, or Firm*—Ernest G. Szoke; Wayne C. Jaeschke; Daniel S. Ortiz

[57] ABSTRACT

The invention is a process and an apparatus for removing metal contamination from soil. In the method, the soil is treated to produce soil with a small particle size. The particulate soil is then separated into a coarse fraction and a fine fraction. The coarse fraction and the fine fraction are contacted with a leach solution in separate contacting zones to remove the metal contamination from the soil, the metal is removed from the leach solution and the leach solution recycled to the leaching zones.

22 Claims, 3 Drawing Sheets

METHOD AND APPARATUS FOR REMOVING METAL CONTAMINATION FROM SOIL

FIELD OF THE INVENTION

The invention is a method and apparatus for removing contamination and particularly heavy metal contamination from soil.

BACKGROUND OF THE INVENTION

The removal of heavy metal contaminants from soils represents a major contemporary environmental problem. Heavy metal contamination can leave the affected ground unusable for agricultural, residential, commercial or recreational purposes. In addition, the metals can eventually leach into the ground water system and lead to widespread water pollution problems.

A number of soil stabilization methods which leave the offending metals in the soil have been developed. However, only removal of the metal from the soil can provide a permanent solution to heavy metal contamination of soils.

In view of the generally localized nature of metal contamination, it would be useful to develop a method which can be carried out in a compact apparatus which can be mounted in a transportable manner so that the apparatus can be moved to sites which require metal contamination to be removed from the soil. The present invention provides a method which can be carried out in a compact apparatus which can be made transportable and can be moved to sites where heavy metal contamination in the soil must be reduced.

Several methods for removing heavy metal contamination from soil have been described in the paper, Extractive Methods for Soil Decontamination: Operational Treatment Installations in The Netherlands, by J. W. Assink, Dutch Organization for Applied Scientific Research presented at the Second International Conference on New Frontiers on Hazardous Waste Management Proceedings, Sep. 27–30, 1987, Pittsburgh, Pa. The paper describes the processes which are operated in the Netherlands to remove contamination from soil. The article discloses the particular difficulty with removing heavy metal contamination from clay and humus particles. The article discloses that generally, the fine clay particles and humus are separated from the soil and discarded. However, since the fine clay particles and humus particles generally contain a substantial portion of the metal contamination, the safe disposal of the heavy metal contaminated fines and humus can be expensive and difficult.

U.S. patent application Ser. No. 07/930,638 discloses a process for removing heavy metal contamination from soil which disclosure is incorporated herein by reference. The process disclosed in U.S. patent application Ser. No. 07/930,638 can be utilized to leach the heavy metal in the process and apparatus of the present invention.

BRIEF DESCRIPTION OF THE INVENTION

According to the present invention, a process for removing reducible heavy metal contamination from soil comprises a) separating substantially metal contaminant free oversize material from contaminated soil; b) separating a metal contaminated fine fraction from a coarse fraction of the contaminated soil; c) passing the fine fraction to a first leaching zone to contact a lean leach solution to remove metal contamination from the fine fraction and to provide a fine fraction with reduced metal contamination and a rich leach solution; d) separating the fine fraction with reduced metal contamination from the rich leach solution; e) passing the rich leach solution from the first leaching zone to a metal recovery zone to remove at least a portion of the metal from the rich leach solution to provide a lean leach solution and a metal containing composition; f) separating the metal containing composition from the lean leach solution and recycling the lean leach solution to the leaching zone.

Where the coarse fraction separated in step b) is also contaminated with heavy metals, the process may further comprise: g) passing the coarse fraction to a second leaching zone to contact a lean leach solution to remove metal contamination from the coarse fraction, to provide a coarse fraction with reduced metal contamination, and a rich leach solution; h) separating the coarse fraction with reduced metal contamination from the rich leach solution: i) passing the rich leach solution from the second leaching zone to a metal recovery zone, to remove at least a portion of the metal from the rich leach solution to provide a lean leach solution and a metal containing composition; and j) separating the metal containing composition from the leach solution and recycling the lean leach solution to the leaching zone.

A second aspect of the present invention is an apparatus for carrying out the above process. The apparatus for removing heavy metal contamination from soil comprises: a) a soil preparation and feed control means, in communication with a size separation means to prepare and introduce contaminated soil to the size separation means; b) a size separation means to receive contaminated soil and separate the contaminated soil into a coarse fraction and a fine fraction; c) a first leaching means in communication with the size separation means to receive the fine fraction of the contaminated soil and to remove metal contamination from the fine fraction by contact with a lean leach solution to form a rich leach solution and a fine fraction with reduced metal contamination; d) a metal recovery means in communication with the first leaching means to receive the rich leach solution, recover metal and provide lean leach solution which can be recycled to the first leaching means.

Where the coarse fraction of the soil to be treated is also contaminated with heavy metals, the apparatus of the invention may further comprise: e) a second leaching means in communication with the size separation means to receive the coarse fraction of the contaminated soil and to remove metal contamination from the coarse fraction by contact with a lean leach solution to form a rich leach solution and a coarse fraction with reduced metal contamination; f) a metal recovery means in communication with the second leaching means to receive the rich leach solution, recover a metal and provide a lean leach solution which can be recycled to the second leaching means.

DETAILED DESCRIPTION OF THE INVENTION

As used herein, the term reducible heavy metal refers to multi-valent metals which are low on the electromotive series relative to aluminum or another sacrificial metal such as magnesium. In particular, the process and apparatus of the present invention is particularly useful for removal of readily reduced contaminating metals such as cobalt, nickel, copper, cadmium, lead, and mercury from contaminated soil. The particular metals set forth above are not limiting but are merely examples of heavy metals which can be removed from soils by the process of the invention.

The process of the present invention utilizes a leach solution which is acidic. Acids such as hydrochloric, sulfuric and nitric can be utilized in the process of the present invention. Due to a ready availability, low cost and rapid leaching rates, hydrochloric acid is a preferred acid for use in the leach solution of the process of the invention. The leach solution preferably contains other adjuvants such as alkali or alkaline earth salts which are useful for increasing the rate at which the leach solution removes the metal contamination from the soil. A preferred adjuvant for use with hydrochloric acid is calcium chloride.

The type of acid used in the leach solution and the pH of the leach solution is dependent upon the metal contamination in the soil and the amount of other compounds which may not be a contaminant but which can be dissolved from the soil by the leach solution.

The ratio of leach solution to soil is dependent upon the amount of heavy metal contamination in the soil, the amount of other materials in the soil which react with the acid leach solution, the concentration of the leach solution, the manner in which the soil and the leach solution are contacted, and other parameters which are known to one skilled in the art. One skilled in the art can readily determine the amount of leach solution required to reduce the amount of heavy metal contamination in the soil and the number of contact stages between soil and leach solution that are required by merely mixing a portion of the contaminated soil with successive amounts of the leach solution and determining the length of time and the extent of reduction in the heavy metal contamination in the soil.

Figure 1:
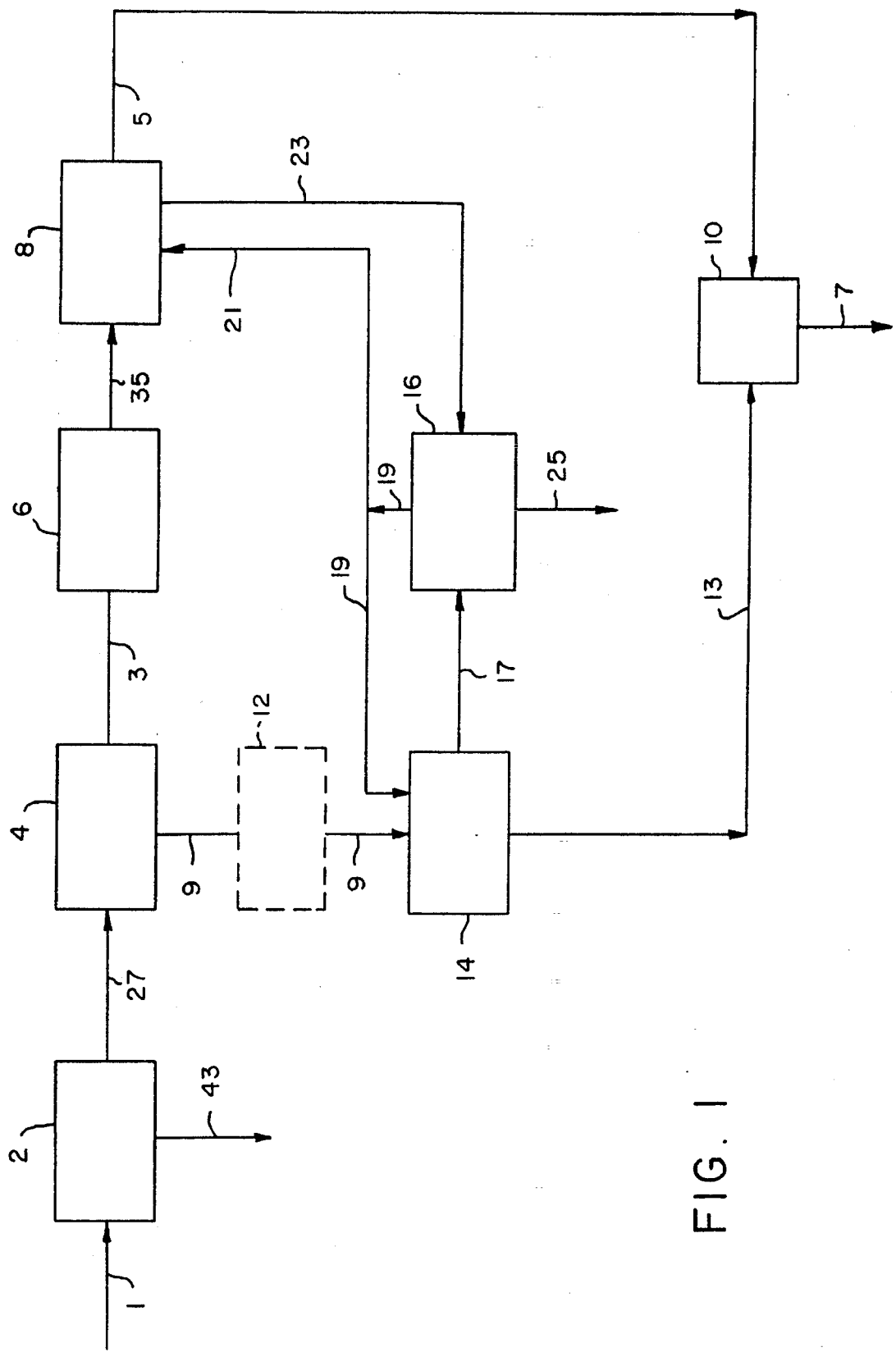
FIG. 1 is a block diagram of the process of the invention.

FIG. 1 is a block diagram of the process of the invention. The contaminated soil is introduced into the process of the invention through means 1 to the soil preparation and metering zone 2. In the soil preparation and metering zone, the soil can be screened or treated by other known means to remove large rocks and pieces such as tree limbs and branches and other matter which are of a large size and do not comprise a substantial portion of heavy metal contamination.

The soil having large rocks and other large objects removed is then passed over a weigh scale or other metering means to determine and control the rate at which the soil is introduced into the process. The metering means can be a weigh belt with integrating means to determine the rate of feed and to adjust the speed of the belt so that the rate of feed to the process can be controlled.

After the screening operation, the lumps and clumps of soil can be broken into small soil particles and large stones and other matter which do not contain substantial amounts of heavy metal contamination. An apparatus such as a trommel with water flow is useful for breaking up the lumps and clumps of soil to provide particulate matter in a size range required in the process. Other means for separating the soil particles can be used. Water can be introduced into the size reduction means to aid in reducing the lumps and clumps in the feed to the process. The soil from the clump and lump breaking means can then pass through a second screening means which further separates any large size particles (larger than about 7 millimeters). Generally, particles which are larger than about 7 millimeters are stones which do not contain a substantial amount of metal contamination, and these particles can be separated and discarded through transfer means 43. If the larger (greater than about 7 mm) particles contain substantial metal contamination they can be recycled and broken or crushed to a proper size for treatment in the process.

The contaminated soil feed passes from the soil preparation and metering zone 2 through transfer means 27 to the size separation zone 4. In the size separation zone 4, the soil is separated into a fine fraction and a coarse fraction. The coarse fraction is generally of a particle size larger than about 60–100 microns and smaller than about 7 millimeters. The fine fraction is generally smaller than about 60–100 microns.

The size separation can be carried out in known means for separating a particulate material into various size fractions. A particularly preferred method for separating the coarse fraction from the fine fraction is to pass the soil into a liquid classifier (U.S. Pat. No. 4,784,757) in which water is passed upward relative to the particles of soil and the fine particles are eluted from the top of the classifier and the large or more dense particles are removed as a sludge from the bottom of the classifier.

The separation between the fine fraction and the coarse fraction is not absolute, but the major portion of the fines can be eluted from the top of the classifier and the major portion of the large particle size materials can be removed from the bottom of the classifier. The particle size cutoff between the fine fraction and the coarse fraction can be changed by merely changing the flow rate of the liquid to the classifier.

It is critical to separate the fine fraction from the coarse fraction since each fraction has different heavy metal leaching characteristics and liquid separation problems. The heavy metals generally cling more tenaciously to the fine particles and therefore to obtain a satisfactory decrease in the heavy metal contamination, the fine fraction generally requires more leaching contact and larger volumes of leach solution to accommodate the more difficult leach operation. In addition, the fine fraction requires different handling and separation means than the coarse fraction. In some cases, the coarse fraction has sufficiently low metal contamination levels that it can be disposed of without leaching.

The fine fraction is passed as a suspension or slurry in water from the size separation zone 4 to a fine fraction dewatering zone 6. Dewatering zone 6 is preferably a settling (clarifier) apparatus but other means for separating fine solids from liquids such as vacuum filters, centrifuges, liquid cyclones and the like can be useful. In fine fraction dewatering zone 6, the mixture of fine fraction particles and water is separated to provide a fine fraction having low water content, and water may be recycled to the soil preparation and metering zone 2 and to size separation zone 4. Dewatering of the fine fraction is preferred to avoid dilution of the leach solution. Preferably, the water used in zones 2, 4, 6 and 12 is neutral or nearly neutral, while the leach solution is necessarily acidic. Approximately neutral water results in very little leaching, so that the solution which wets oversize material (over about 7 mm) in zone 2 does not carry with it dissolved metal when the oversize material is discarded. Preferably, the fine fraction is dewatered to contain less than about 70% water, and more preferably less than about 50% water. In some cases, the soil carries with it organic matter such as leaves, twigs, or pieces of plastic. This organic matter tends to appear in the water recovered from the preferred fine fraction dewatering zone 6, and may conveniently be removed by screening. Other means for dewatering slurries such as vacuum filters and the like can be used to provide a fine fraction with reduced water content.

The dewatered fine fraction from zone 6 is passed to first leaching zone 8 through transfer means 35. In first leaching zone 8, the fine fraction is contacted with an acid leach solution to dissolve the metal contaminant from the soil. The pH of the leach solution is dependent upon the metal contaminant which is being removed from the soil, and the amount of other components which may dissolve in the leach solution at the pH range selected. Preferably the pH of the leach solution is from about 1.5 to about 5 and more preferably from about 2 to about 3.

The time for contact of the fine fraction with the leach solution is not as important as it is for the coarse fraction. The rate of approach to equilibrium for leaching the fine fraction is quite rapid, and in the preferred leaching apparatus leaching continues to occur after mixing and during the time the fine fraction separates from the leach solution. In contacting the fine fraction with leach solution, the time of mixing the two phases can be as low as about 5 to 10 seconds to as high as 30 minutes. Of more importance is the weight ratio of leach solution to fine fraction, the number of mixing-settling contacting zones used, and the manner of advancing the two phases relative to each other. The weight ratio of leach solution to fine fraction is from about 1:1 to about 50:1 and preferably from about 3:1 to about 30:1 and more preferably from about 10:1 to about 20:1. The number of mixing-settling contacts may be from one to six and preferably from three to four.

The fine fraction is generally contacted with the leach solution so that the phases advance in a manner counter current relative to each other. That is, the fine fraction is introduced into the first stage of a series of mixer-settler stages and the lean leach solution is introduced into the series of mixer-settler stages at the last stage. The fine fraction then flows from one stage to the subsequent one and leaves the leach zone from the last contacting stage in the series. The leach solution enters the leaching zone through the last contacting stage in the series and proceeds through the series of contacting zones and leaves the system through the first contacting stage. In the countercurrent contacting method, the fine fraction with the lowest concentration of heavy metal contacts the leach solution with the lowest concentration of heavy metal.

Alternatively, contact may be made in a cross flow manner, in which the fine fraction is advanced from one mixer-settling contact to the next while lean leach solution is added to each contact mixer and then passed after separating of the fine fraction directly to the metal removal zone. In a further alternate embodiment, a portion of the mixer-settler contacts may be made in a cross flow manner and the remainder made in a countercurrent manner. Preferably, the first contact stage is a cross flow contact and the remainder are made in a countercurrent manner.

The first leaching zone 8 comprises at least one stage. The mixing settling stage is preferably comprised of a mixer, wherein the fine fraction is mixed with leach solution, and a clarifier, wherein the fine fraction settles from the leach solution and becomes substantially dewatered. Preferably, from two to six mixer-clarifier stages, and more preferably three or four mixer-clarifier stages operated in series are utilized as the first leaching zone. The fine fraction leaves the last contacting means in the series and is passed to decontaminated soil treating zone 10 through transfer means 5.

The decontaminated fine fraction can pass through other means to further reduce the content of leach solution such as a filter separation and water wash.

In zone 10 the acidity in any leach solution still associated with the decontaminated fine fraction is neutralized, and the fine fraction is then disposed of through transfer means 7. Alternatively, the fine fraction may first be combined with the decontaminated coarse fraction and the oversize material, neutralized by mixing with a base such as lime or limestone, and then disposed of.

The rich leach solution, which has contacted the fine fraction in zone 8 and removed at least a portion of the heavy metals contained therein, is passed by transfer means 23 to a metal recovery zone 16.

As previously indicated, the coarse fraction may have sufficiently low metal contamination levels so that the coarse fraction does not require leaching. In such cases, the coarse fraction is separated from the soil in zone 4 and either disposed of separately or combined with the decontaminated fine fraction in zone 10 for disposal. However, in cases where the coarse fraction contains unacceptably high levels of metal contamination, the coarse fraction from the size separation zone 4 is passed to a second leaching zone 14 through transfer means 9. In the second leaching zone 14, the coarse fraction is contacted with lean leach solution to remove the metal contamination from the coarse fraction and provide a coarse fraction with a reduced content of metal and a rich leach solution.

The coarse fraction generally comprises materials of low porosity, relatively low surface area, and decreased binding strength for heavy metal atoms, so the heavy metal contamination does not hold as tenaciously to the coarse particles as to the fine fraction. Therefore, the volume of leach solution in relation to the amount of coarse fraction can be much lower. However, the time of contact between the coarse fraction and the leach solution may be longer than for the fine fraction, as there may be remaining particulate metal or metal oxide that must be completely dissolved. Generally, the coarse fraction is contacted with the leach solution for a period of from about 1 to about 60 minutes, preferably from about 5 to about 30 minutes, and most preferably from about 10 to about 20 minutes. The weight ratio of leach solution to coarse fraction is in the range of about 1:1 to about 10:1 and preferably from about 1.5:1 to about 5:1 and most preferably from about 2:1 to about 3:1.

In a preferred method, the coarse fraction is passed to a horizontal interrupted auger in which the coarse fraction is mixed in a countercurrent manner with the amount of lean leach solution required to reduce metal contamination of the coarse fraction to a required level. The coarse fraction can be passed from the horizontal auger to an inclined auger which lifts the coarse fraction material from the leach solution, and into which lean leach solution is introduced to wash a portion of the rich leach solution containing the metal contamination from the coarse fraction. The coarse fraction with the reduced metal contamination can also be contacted with water to further reduce the amount of leach solution associated with the coarse fraction. The wash solution is passed from the inclined auger to the horizontal auger to provide countercurrent mixing therein with the coarse fraction. In addition the inclined auger dewaters the coarse material prior to disposal.

The rich leach solution from the second leaching zone is passed to a metal recovery zone 16. Optionally, the rich leach solution is first passed to a clarifier or other solid liquid separation means for removal of any fine particles that may be present. In metal recovery zone 16, the rich leach solution is treated to remove the metal which has been leached from the soil, and to provide a lean leach solution which can be recirculated to the leaching zones to remove metal contamination from the soil being treated.

The metal recovery zone 16 can comprise known means for separating metals from aqueous acid leach solutions. The method for recovering the metal from the leach solution is dependent upon the metal, the type of acid in the leach solution, the metal contaminants and in addition the other metals which may have leached from the soil.

The leach solution from the second leaching zone 14 can be treated separately from the leach solution from the first leaching zone 8 or the two leach solutions can be mixed and treated in a common metal recovery zone. It can be advantageous to utilize two separate metal recovery zones. The metal concentration in the rich leach solution from the first leaching zone may be very different from that of the rich leach solution from the second leaching zone, so that optimum metal recovery conditions may be different for each rich leach solution.

Depending upon the acid utilized and the metal contaminant, the metal can be recovered from the rich leach solution by electrowinning, by solvent extraction means, by cementation means or other means for recovering metals from acid solutions. Methods for recovering metals from acid leach solutions are dependent upon the acid utilized, and the metal or mixture of metals to be recovered.

A preferred method for recovering lead from a hydrochloric acid rich leach solution is by an electrodisplacement method. Electrodisplacement is chemically similar to cementation, in which an elemental metal higher on the electromotive series is placed in contact with a solution of a metal lower on the electromotive series; the higher metal dissolves and the lower metal precipitates from solution. A preferred metal for cementation of lead is aluminum. Rich leach solution containing lead may be treated by cementation with granules of aluminum, but this method has several disadvantages. To obtain good contact of the solution with the granules, the mixture must either be stirred or the granules must be fluidized by the solution; in either case the energy required for contacting the granules efficiently is high. Alternatively, very small granules may be used, but these dissolve rapidly, making it difficult to separate the diminished aluminum granules from the precipitated lead. If bulkier pieces of the higher metal such as aluminum rods are used to provide a large reservoir of reducing potential, then the surface area for reduction of the lower metal, such as lead, is relatively small, and large numbers of aluminum rods must be used to reach low levels of lead in the lean leach solution. A low level of lead in the lean leach solution is important because in a countercurrent leach process, this is the solution that the decontaminated soil is wetted with when it leaves the process. Any lead in that solution is present as soluble lead, and will make it more difficult to reach levels safe for disposal of the soil.

Electrowinning is an alternative metal removal means, but electrowinning in the presence of a leach solution containing chloride has the disadvantage of producing toxic chlorine gas at the anode.

The electrodisplacement cell retains the advantages of both cementation and electrowinning. In the preferred electrodisplacement method, the rich leach solution containing lead in a hydrochloric acid-calcium chloride aqueous solution is passed through a vessel containing a plurality of electrodisplacement means comprising a metallic reducing component connected electrically with a high surface area metal mesh component. Preferably the reducing component is aluminum and the metal mesh component comprises stainless steel wire. Preferably the electrodisplacement means comprises aluminum rods in close proximity to and in electrical contact with a pad of fine stainless steel filaments having a high surface area. In the method, the aluminum passes into solution and the lead deposits in the interstices of the stainless steel pad and on the surface of the aluminum rod. Thus the aluminum rods provide a large reservoir of chemical reduction potential, while the electrically connected but inert stainless steel mesh provides the high surface area necessary for efficient reduction of the lead. The lead is deposited loosely on both the aluminum rods and the wire mesh, and can be removed by spraying with a wash solution. A portion of the lead falls to the cell floor as a sludge, and may be removed separately. No chlorine is generated, since no external voltage is applied to the cell.

The lean leach solution from the metal recovery zone 16 can be returned through transfer means 21 to the first leaching zone 8 and through transfer means 19 to the second leaching zone 14. Optionally, lean leaching solutions exiting metal recovery zone 16 can be combined, such as in a surge vessel, before being recycled to the leaching zones. Acid lost by reaction of components in the soil with the leach acid or by reaction in the metal recovery zone can be replaced by introducing acid into the lean leach solution as it is passed from the metal recovery zone 16 to the leaching zones 8 and 14.

An optional step in treating the coarse fraction is to pass the coarse fraction, before introduction into the second leaching zone 14, into a particulate metal separation zone 12. Passing the coarse fraction through a particulate metal separation zone 12 before introducing the coarse fraction into the second leaching zone 14 can remove particulate metal and certain metal compounds from the coarse fraction. Removing the particulate metal from the coarse fraction reduces the leaching load in the leaching step. That is, it reduces the amount of metal which must be dissolved and passed into solution and in addition reduces the amount of metal which must be recovered from the rich leach solution. In addition, coarse particulate metals dissolve relatively slowly in the leaching zone because of the relatively small surface area of the metal particles.

If the soil contains substantial amounts of metallic iron or magnetic materials, the particulate magnetic iron or magnetic compound can be removed from the coarse fraction by passing the coarse fraction in close proximity to a magnet. This is an inexpensive and rapid method for removing magnetic materials from the coarse fraction which would otherwise tend to consume acid in leaching and hinder the dissolution of contaminating heavy metals.

If the metallic particles in the coarse fraction are not magnetic, the metallic particles can be separated from the coarse fraction by means which utilize the difference in density between the coarse soil particles and metal particles. Jigs, cyclones and shaking tables can be utilized in a known manner to separate dense metal particles from the coarse fraction of the soil. The use of a particulate metal separation zone is an optional step in the process and is useful when the coarse fraction contains a significant amount of metal or metal compounds which exhibit magnetic properties or have a density sufficiently higher than the soil particles.

The coarse fraction which has had the contaminating metal removed by contact with the leaching solution, is passed by transfer means 13 to decontaminated soil treatment zone 10, where it is prepared by neutralization for disposal. If the metal contaminants have been reduced sufficiently and pose no threat to the environment, the decontaminated coarse fraction can be taken to land fills or returned to the site from which it was taken. Preferably the coarse fraction, fine fraction and oversize material are blended, neutralized, and returned to the site from which the soil was taken.

The process of the invention has been described in accordance with FIG. 1 and the apparatus which is utilized to carry out the process has been described.

Figure 2:
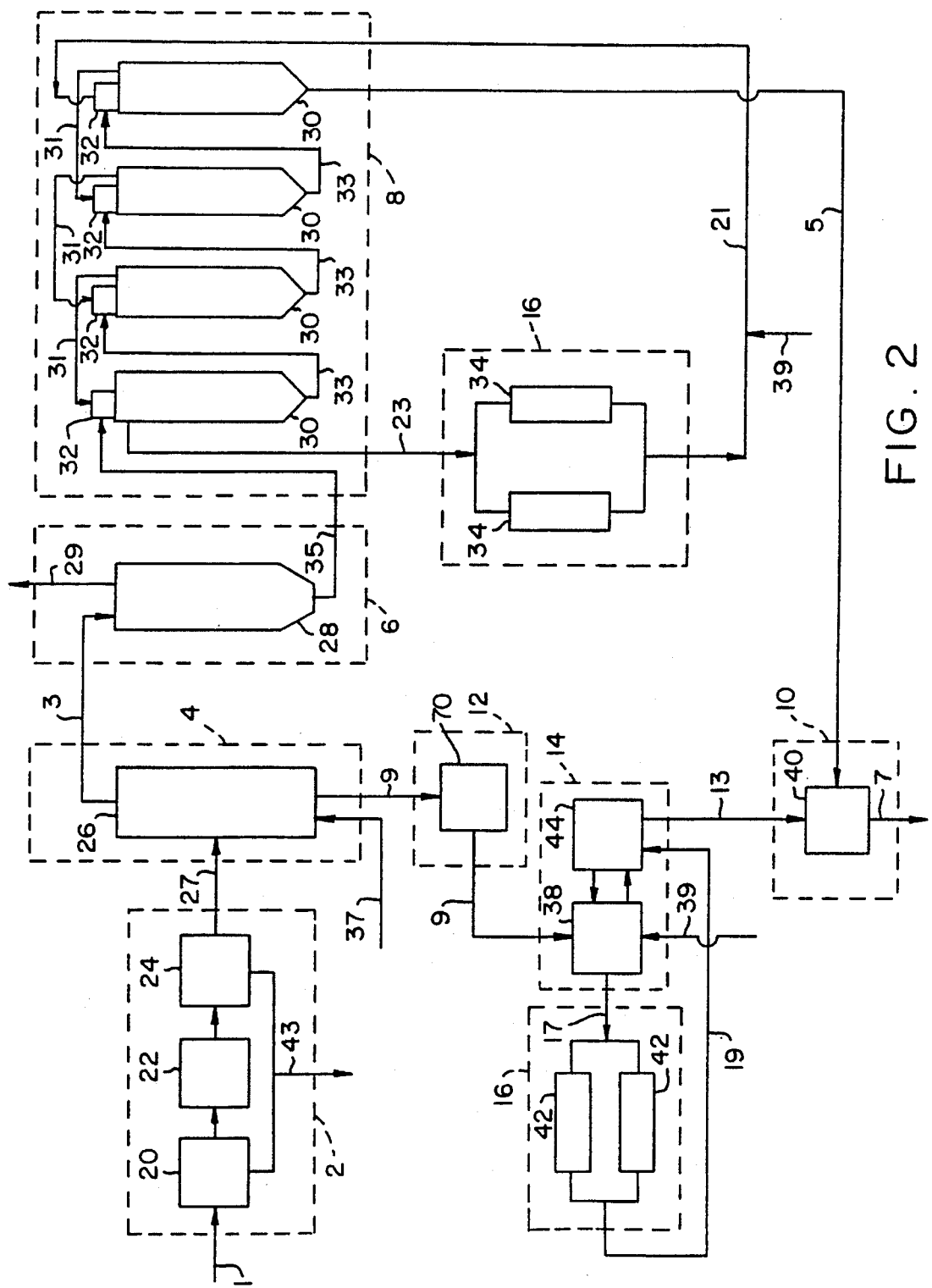
FIG. 2 is a diagrammatic representation of a specific embodiment of the apparatus of the invention.

FIG. 2 is a diagram of the process showing specific pieces of apparatus which can be applied. The dashed lines around the groups of apparatus are utilized to define the zones which are noted by the same number as used in FIG. 1.

In relation to FIG. 2, the contaminated soil enters the process through feed means 1 which can include means for delivery of the contaminated soil from the area to be decontaminated to the apparatus of the invention which can be transportably mounted and moved to the location where the soil is to be treated.

The soil is generally introduced through means 1 into the process through a coarse screening means in soil preparation and metering zone 2. The soil is passed through a coarse screen to remove large rocks, tree stumps, branches and the like from the soil entering the process. After the screening operation, the soil passes to a metering or flow control device to control the rate at which the soil is introduced into the process. The metering and flow control device can be a weigh belt, a hopper with a feeder or any other means known in the art for controlling the flow of a solid material. The screening and metering means are shown as 20 in FIG. 2.

The contaminated soil is then introduced into a means 22 for breaking up the lumps and clumps of soil fed into the process. A particularly useful apparatus for breaking up the clumps and lumps of soil is a trommel. Water can be introduced into the trommel to aid in breaking up the lumps and clumps of soil. The soil preparation and clump and lump breaking means is shown as 22 in FIG. 2. The soil leaving the clump and lump breaking means is in the form of oversize, coarse and fine particulate matter.

The prepared soil exits the clump and lump breaking means 22 and passes to a screening means 24 wherein oversize particles of a diameter larger than about 7 mm. are removed from the mixture. The oversize material generally comprises rocks which have a low amount of metal contamination. If the amount of metal contamination is sufficiently small, the oversize material can be discarded without further treatment. Optionally, the oversize material can be combined with fine and coarse fractions after they are decontaminated, and discarded or returned to the site from which the soil was taken. The rocks, stumps, tree limbs and oversized materials which are not contaminated with metals can be discarded through transfer means 43. If any soil clumps and lumps remain, they can be recycled to the lump and clump breaking means for further processing. If the stones of a particle size larger than about 7 mm. contain a substantial amount of metal contamination, they can be recycled through a stone crushing means and into the lump and clump breaking means to provide a material with a particle size suitable for leaching in the process.

The prepared soil from the screening means 24 passes through transfer means 27 to size separation zone 4. Size separation zone 4 comprises a means 26 for separating the prepared soil into a fine fraction and a coarse fraction. A vertical liquid classifier, using upflowing water provided by transfer means 37, can be utilized to perform this function. The fine fraction generally has a particle size smaller than about 60 to 150 microns and preferably smaller than about 100 microns and most preferably smaller than about 75 microns. The particle size cutoff can be controlled and is selected based on the leaching properties and metal content of the various size ranges of particles. The coarse fraction preferably comprises particles in the range of smaller than about 7 mm to larger than about 60 microns to about 150 microns, and more preferably larger than about 75 microns to about 100 microns.

The soil is separated into a fine fraction and a coarse fraction, since the two fractions present different problems in removing heavy metal from the soil. The heavy metals generally are held more tenaciously by the fine fraction and therefore the amount of leaching solution required is substantially greater than that required to leach the coarse fraction. In addition, separation of the fine particles from the liquid leaching medium presents different problems than that for the coarse fraction and therefore different apparatuses are required.

In some cases, the coarse fraction has sufficiently low metal concentrations that it does not require leaching to meet environmental standards. In such cases, only the fine fraction need be leached. However, in many cases the coarse fraction also requires leaching.

In other cases, such as with sediment, the soil may contain only a fine fraction, so that no size separation is necessary and the soil can be passed directly to the first leaching zone 8.

In the case where a coarse fraction is present and does contain substantial metal contamination, the coarse fraction from the separation zone 4 may be passed to an optional particulate metal separation zone 12, comprising particulate metal removal means 70. If the coarse fraction contains a substantial amount of discrete metal or metal compound particles which can react with the leach solution, the particulate metal or particulate metal compounds in the coarse fraction which react with the leach solution can be removed to substantially reduce the load on the leaching zone and in addition reduce the load on the metal recovery zone.

The metal particles, if they are magnetic, can be removed by passing the metal particles close to a magnetic surface. A variety of magnetic removal devices are commercially available such as those offered by Eriez Magnetics, Erie, Pa. However, other means which utilize a gravity difference between the metal and the soil particles are preferred. A particularly useful means is a jig or riffle board which separates heavy metal or heavy metal oxide particles from the soil. A particulate metal separation zone is not required if the contaminated soil does not contain substantial amounts of particulate metal or metal compounds.

The coarse fraction passes from the particulate metal separation zone 12, or in the case wherein no substantial metal particles are present, from size separation zone 4, through transfer means 9 to a second leaching zone 14. The second leaching zone 14 is a means for contacting the coarse fraction with lean leach solution. The coarse fraction generally contains lower metal contamination levels, and in addition is easier to separate from the leach solution. Therefore, an apparatus different than required for the fine fraction is generally used as the second leaching zone.

A horizontal interrupted auger or a trough with rotating paddle means has been found useful as the coarse fraction leaching zone 14, and is shown as 38 in FIG. 2. The horizontal interrupted auger is particularly useful since the coarse fraction readily separates from the leach solution and the motion of the auger in the leach solution continuously stirs and moves the coarse particles in countercurrent contact with the leach solution. Useful equipment for leaching zone 14 includes a horizontal contactor manufactured by Greerco, and a "log washer" or coarse material washer manufactured by Eagle Iron Works. These units comprise a trough having an axial shaft equipped with paddles; as the shaft turns, the paddles stir the coarse fraction and advance it in a direction countercurrent to the flow of the leach solution.

The rich leach solution which has contacted the coarse fraction in zone 14 is passed through transfer means 17 to a metal recovery zone 16. Optionally, the rich leach solution is first passed through a particulate removal means to remove any fine particles that may be present, and then passed to the metal recovery zone.

The leached coarse fraction is passed from the horizontal interrupted auger to an inclined auger 44 in which the coarse fraction is moved upwardly so that the leach solution is drained. The coarse fraction in the inclined auger can be washed with water or with lean leach solution to displace remaining quantities of the rich leach solution. The washing lean leach solution, together with displaced rich leach solution, flows back into the horizontal contactor. Thus the inclined auger rapidly dewaters the coarse fraction, and also serves as a means for addition of lean leach solution in a manner that allows countercurrent contact in the horizontal auger of leach solution with the coarse fraction.

After passing through the inclined auger of the second leaching zone 14, the decontaminated coarse fraction is passed through transfer means 13 to a decontaminated soil treatment zone 10. Decontaminated soil treatment zone 10 comprises a means 70 in which the coarse fraction is prepared for return to the environment. In zone 10, decontaminated soil is mixed with a sufficient amount of an alkaline material such as lime or limestone to neutralize the acidity of any leach solution which remains associated with the decontaminated soil. Optionally, the decontaminated coarse fraction is combined with the decontaminated fine fraction and the oversize material (over about 7 mm), and neutralized. Mixing of these components is preferably done in a pug mill or similar device. After mixing and neutralization, the decontaminated soil can be discharged or returned through transfer means 7 to the site from which it was taken.

The fine fraction from the size separation zone 4 and classifier 26, which is a slurry or suspension in water, passes through transfer means 3 to fine fraction dewatering zone 6. Fine fraction dewatering zone 6 can comprise any means which can separate the water from the fine fraction. The water is separated from the fine fraction preferably in a clarifier means 28. Water exits as an overflow through transfer means 29. Organic matter which is lighter than water, such as leaves, twigs and plastic, can be separated from the water in transfer means 29 by screening. Recovered water can be utilized in other parts of the operation such as in the classifier or the trommel wherein the clumps and lumps of soil are reduced to particulate matter or in the size separation zone 4.

The fine fraction dewatering zone means 6 prevents undesirable dilution of leach solution in the first leaching zone 8. The leach solution is necessarily acidic to cause dissolution of the heavy metal component from the soil, but the water used in zones 2, 4, 6 and 12 is desirably about neutral. Metal dissolution under about neutral conditions is greatly retarded, so that oversize materials (over about 7 mm.) separated in zone 2 are not wetted with a solution high in heavy metal levels.

The dewatered fine fraction passes through transfer means 35 to the first leaching zone 8.

A preferred apparatus for carrying out the leaching step comprises a series of mixer-clarifier units operated countercurrently. The number of mixer-clarifier units utilized in the leaching zone is dependent upon the metal which is being leached from the fine fraction, the tenacity with which the fine fraction holds onto the metal, and the degree of difficulty in settling and dewatering the fine fraction. For removal of lead contamination, four clarifiers operated in series have been found to be suitable. The fine fraction from the fine fraction dewatering zone 6 is mixed in mixer 32 with overflow from the second clarifier 30 in the series and introduced into the first clarifier 30. Underflow is removed from the bottom of the first clarifier 30 through transfer means 33, mixed in mixer 32 with overflow 31 from the third clarifier 30, and introduced into the upper portion of the second clarifier 30. Overflow from the first clarifier 30 comprises rich leach solution, and is passed through transfer means 23 to the metal recovery zone 16. Optionally the rich leach solution can be passed through an additional liquid solid separation means such as a filter or the like to remove particulate matter.

The underflow from the second classifier 30 in the series is mixed in mixer 32 with overflow from the fourth clarifier 30, and is introduced into the upper section of the third clarifier 30 in the series. The underflow from the third clarifier 30 in the series is mixed in mixer 32 with lean leach solution, and is introduced near the upper portion of the fourth or last clarifier in the series. The lean leach solution enters the fourth clarifier through transfer means 21 from the metal recovery zone.

Alternatively, the mixer-clarifier units 30 and 32 can be operated in a cross flow manner, in which the fine fraction is progressively advanced from the first clarifier in the series to the last clarifier, and lean leach solution is mixed in each mixer 32 with advancing fine fraction, and overflow from each clarifier is passed to the metal recovery zone 16. This alternative does not build as high a metal concentration in the rich leach solution as does countercurrent operation, but it gives more complete removal of metal from the fine fraction.

In another alternative, a combination of countercurrent and cross flow methods can be used. This combination provides levels of metal concentrations in the leach solution and completeness of metal removal from the soil which are intermediate between that of countercurrent and cross flow operation.

The underflow from the last clarifier 30 in the series is passed through transfer means 5 as a slurry or paste to a decontaminated soil treatment zone 10. In the decontaminated soil treatment zone 10, the fine fraction can be treated to further reduce the amount of leach solution and in a means 40 to neutralize acidity in the leach solution which remains associated with the decontaminated soil. Optionally, the decontaminated fine fraction may be recombined with the decontaminated coarse fraction and the oversize material (over about 7 mm), and then neutralized. Preferably, the decontaminated soil is mixed with a sufficient amount of basic material such as lime or limestone to at least neutralize the contained acid. Decontaminated soil treatment zone 10 preferably comprises a ribbon mixer or a pug mill or similar device. If the soil has been decontaminated to the desired degree, the decontaminated and neutralized soil can be discharged or returned by transfer means 7 to the place from which it was removed.

The rich leach solution which has contacted the fine fraction and the rich leach solution which has contacted the coarse fraction are passed from their respective leaching zones to the metal recovery zone 16. In metal recovery zone 16, the metal which has been removed from the soil is recovered from the rich leach solution to provide a metal containing composition and a lean leach solution. The metal recovery zone can be any method for recovering metal from leach solutions and in particular means which recover the metal and permit recycle of the leach solution.

Metal recovery means such as electrolysis, extraction of the metal ions from the leach solution by contact with an extraction agent in an immiscible solvent, ion exchange, cementation and other means known for regenerating leach solutions may be used.

A preferred method for recovering the metal from the rich leach solution is by a cementation process. In the cementation process, the leach solution is contacted with a metal which is higher in the electromotive series than the metal to be recovered. The metal higher in the electromotive series passes into the solution and the metal to be removed from the leach solution is precipitated.

A more preferred metal removal apparatus, especially where the metal to be removed is lead, is an electrodisplacement cell containing a plurality of electrodisplacement assemblies. Each assembly comprises a metallic reducing component electrically connected to a high surface area metal mesh component. Preferably, each assembly comprises a plurality of aluminum rods which are in electrical contact with a stainless steel mesh of high porosity and surface area.

Figure 3:
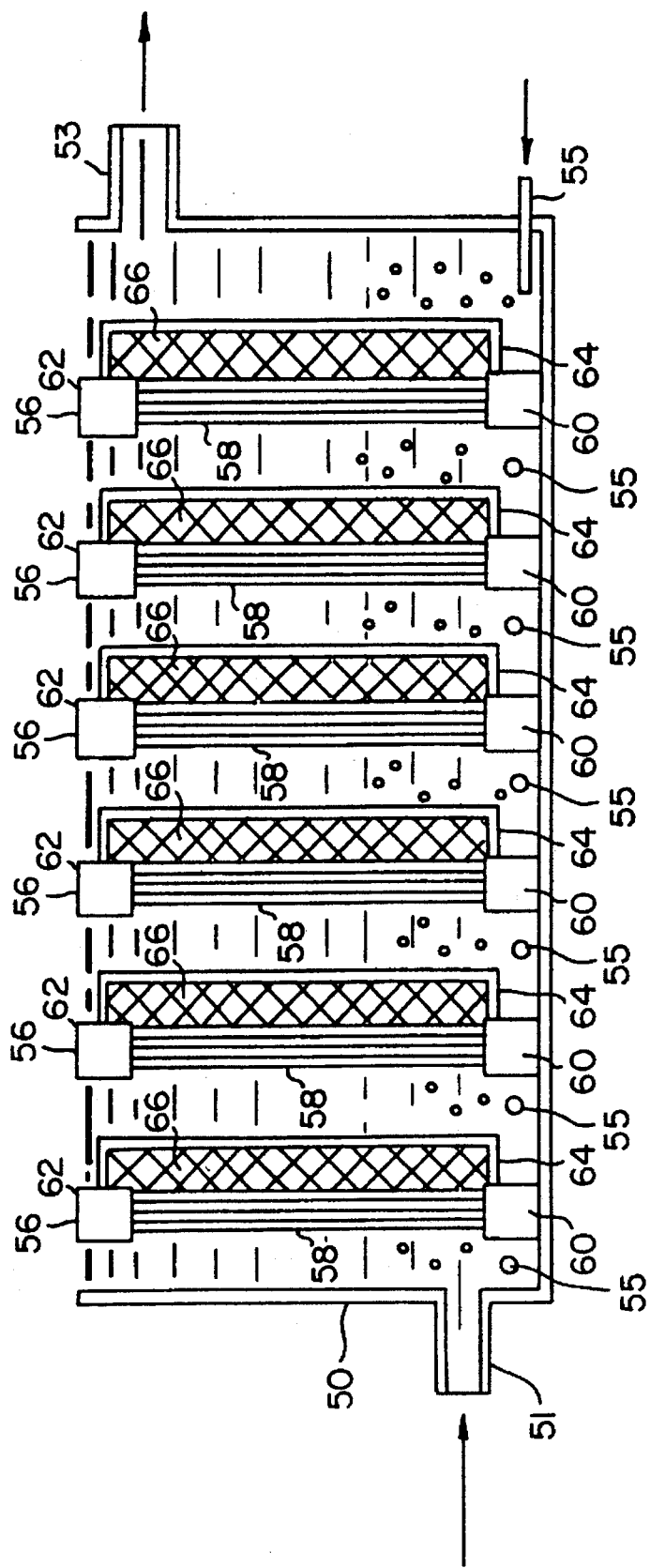
FIG. 3 is a view in section of a metal recovery device which is useful in the practice of the invention.

A preferred form of the electrodisplacement cell is shown in FIG. 3. FIG. 3 comprises a vessel containing a series of electrodisplacement assemblies comprising groups of aluminum rods or bars in electrical contact with and in close proximity to a pad of metal mesh. FIG. 3 shows an arrangement of several of the assemblies of aluminum rods and pads of metal mesh through which the rich leach solution passes to deposit the metal contaminants in the metal mesh and dissolve the aluminum into the solution. When a sufficient amount of the metal has been deposited in the metal mesh, the assemblies can be removed from the metal recovery zone and the metal recovered from the metal mesh. After the metal has been recovered from the metal mesh, the assemblies can be reinserted into the electrodisplacement vessel.

As shown in FIG. 3, the metal recovery zone comprises a vessel 50 which is preferably formed from an electroconductive material such as stainless steel. As long as aluminum rods are present in and in electrical contact with the vessel, the vessel will be protected from corrosion. The vessel 50 has an inlet 51 for the rich leach solution and an outlet 53 at the opposite end for the lean leach solution. Preferably outlet 53 comprises a weir over which lean leach solution flows. The metal recovery vessel 50 contains a number (six shown) of electrodisplacement assemblies 56 which comprise a plurality of aluminum rods 58 inserted in holes in the top 62 of the electrodisplacement assembly. The top 62 and bottom 60 of the electrodisplacement assembly are made from electrically conductive materials so that there is electrical contact between the anode rods inserted in the holes of the metal recovery cartridge and the metal mesh pad 66° Metal recovery assembly 56 also includes metal mesh pad holding means 64 which can be formed from expanded metal or a foraminous sheet. The metal mesh holding means supports a pad 66 of the metal mesh such as stainless steel which lies adjacent to and in contact with the holder for the aluminum rods 58. The pad 66 includes materials such as stainless steel gauze or wire mesh.

Each assembly 56 is independently removable from the metal recovery zone vessel 50 so that the aluminum rods can be replaced as needed and the metal pad can be washed or otherwise processed to recover the metal deposited therein. The large surface area of the metal mesh pad in electrical contact with the aluminum rods provides for rapid removal of the metal from the leach solution.

The metal recovery vessel 50 can also have means shown as 55 for agitating the leach solution. This is useful to minimize channeling and short-circuiting, and to enhance contact between liquid and solid surfaces. A preferred means of agitating the leach solution is by bubbling air or other gases through sparge tubes 55 located at the bottom of the vessel 50 though the spaces between the metal recovery cartridges 56. The bubbling air or other gas is useful for agitating the solution and improving the exposure of dissolved metal ions to the reducing surfaces of the aluminum rods and the wire mesh. FIG. 3 shows sparging tubes entering from the sides of vessel 50 between assemblies 56 but a longitudinal sparge tube can also be used.

The aluminum rods 58 are loosely mounted in holes in the top 62 and rest on the bottom 60 of the assembly. The loose fit of the aluminum rods permits ready replacement of the aluminum rods when they become sufficiently dissolved in the leach solution.

The rich leach solution which has contacted the fine fraction and the rich leach solution which has contacted the coarse fraction can be mixed and processed in a single metal recovery zone or the two streams can be maintained separately and processed in individual metal recovery zones. It is preferred, as shown in FIG. 2, that the rich leach solution which has contacted the fine fraction and the rich leach solution which has contacted the coarse fraction are treated separately in metal recovery zone 16.

The rich leach solution which contacted the fine fraction enters the metal recovery zone 16 through transfer means 23 and passes through one or more electrodisplacement vessels 34 operated in parallel. The lean leach solution from the metal recovery zone passes through transfer means 21 and is returned to the leaching zone 8 and in particular the last mixer-clarifier in the series and any additional mixer-clarifiers which may be operated in a cross-flow manner.

Make up water, acid, or other adjuvants which have been depleted from the leach solution can be introduced into the leach solution through transfer means 39. Acid may also be added to any of the mixers in which clarifier underflow and leaching solution are mixed, to control the pH of leaching.

The rich leach solution which has contacted the coarse fraction in leaching zone 14 passes from the leaching means 38 through transfer means 17 to metal recovery zone 16. Optionally, the rich leach solution is first passed to a solid separation means (not shown) which can be a clarifier to remove fine solids which may be present. The rich leach solution passes through transfer means 17 to one or more metal recovery vessels 42 operated in parallel. The lean leach solution from the metal recovery zone passes through transfer means 19 and returns to the leaching zone 14. Agents such as acid or other adjuvants which must be introduced into the leaching solution to replace any of the materials which have been reacted or lost from the system can be introduced through transfer means 39, preferably into the leaching means 38.

Optionally, lean leach solution from transfer means 19 and 21 may be combined in a surge vessel, and then passed to the respective leaching zones.

The process and the apparatus have been illustrated. However, means such as conveyor belts, pumps, and the like have not been included in the drawing for convenience in understanding the process. As one skilled in the art would understand, there must be some means to move the material from one zone to the next. This can be accomplished by pump means or by arranging the various pieces of equipment at different elevations so that the liquids can flow by gravity from one zone to the next.

The process as illustrated above is especially useful for recovering metals such as lead or lead oxide from soil. The leach solution for recovering lead or lead oxide from soil is preferably a leach solution comprising hydrogen chloride to provide a pH of between 1.5 and 5, more preferably between 2 and 3, and from about 2% to about 10% by weight, more preferably from 4% to 6% by weight of calcium chloride in water.

The process of the present invention and the apparatus utilized to carry out the process, are particularly useful for recovering the contaminating metal from contaminated soil and can provide a decontaminated soil which is acceptable in the environment. The process of the present invention substantially reduces the potential of the soil for causing water pollution and contamination of other water resources with heavy metals. The removal of the heavy metals from the top layers of the soil prevents the heavy metals from contacting plants, animals and humans with which the soil comes in contact. The process of the present invention is an advance in the art and by virtue of providing means for metal extraction of the contaminating metals from soils at a reasonable cost permits rehabilitation of environments which have been seriously polluted and which can be made useful for human activity.

The equipment for carrying out the process of the invention is simple, can be transportably mounted and easily moved from site to site which is to be decontaminated.

We claim:

1. A process for removing lead contamination from soil which comprises:

(a) providing a lead contaminated fine fraction of the contaminated soil;

(b) passing the lead contaminated fine fraction to a first leaching zone to contact a lean leach solution consisting essentially of from about 2 to about 10% by weight of calcium chloride at a pH of from 1.5 to 5, to remove lead contaminant from the fine fraction, and provide a fine fraction with reduced lead contamination and a rich leach solution;

(c) separating the fine fraction with reduced lead contamination from the rich leach solution;

(d) passing the rich leach solution from the first leaching zone to a metal recovery zone to remove at least a portion of the lead from the rich leach solution to provide a lean leach solution and a lead containing composition; and (e) separating the lead containing composition from the leach solution and recycling the lean leach solution to the leaching zone.

2. A process of claim 1 wherein the lead contaminated fine fraction also contains at least one metal contaminant selected from the group consisting of copper, cobalt, nickel, cadmium and mercury.

3. The process of claim 1 further comprising the steps of:

(f) providing a lead contaminated coarse fraction of the contaminated soil;

(g) passing the lead contaminated coarse fraction to a second leaching zone to contact a lean leach solution consisting essentially of from about 2% to about 10% by weight calcium chloride at a pH of from 1.5 to 5, to remove lead contaminant from the coarse fraction and provide a coarse fraction with reduced lead contamination and a rich leach solution;

(h) separating the coarse fraction with reduced lead contamination from the rich leach solution; and (i) passing the rich leach solution from the second leaching zone to a metal recovery zone, to remove at least a portion of the lead from the rich leach solution to provide a lean leach solution and a lead containing composition; and (j) separating the lead containing composition from the lean leach solution and recycling the lean leach solution to the leaching zone.

4. The process of claim 3 wherein particulate metal or metal compounds are removed from the coarse fraction before the coarse fraction is passed to the second leaching zone.

5. The process of claim 3 wherein the coarse fraction is contacted with the leach solution in a countercurrent manner.

6. The process of claim 1 wherein the lean leach solution comprises an aqueous HCl solution.

7. The process of claim 1 wherein the first leaching zone comprises from two to six contact stages.

8. The process of claim 7 wherein the fine fraction is contacted countercurrently with the leach solution.

9. The process of claim 7 wherein the pH in each contact stage is controlled by addition of acid.

10. The process of claim 1 wherein lead is removed from the rich leach solution by passing the leach solution through and in contact with at least one electrodisplacement cell comprising rods of a reducing metal for the lead adjacent to and in an electrical communication with a high surface area metal mesh component for deposition of the lead.

11. The process of claim 3 wherein lead is removed from the rich leach solution by passing the leach solution through and in contact with at least one electrodisplacement cell comprising rods of a reducing metal for the lead adjacent to and in an electrical communication with a high surface area metal mesh component for deposition of the lead.

12. The process of claim 3 wherein the lead contaminated coarse fraction also contains at least one metal contaminant selected from the group consisting of copper, cobalt, nickel, cadmium and mercury.

13. The process of claim 10 wherein the reducing component comprises aluminum, and the metal mesh comprises stainless steel.

14. The process of claim 10 wherein a gas is sparged through the leach solution in the electrodisplacement cells.

15. The process of claim 1 wherein a ratio by weight of leach solution to fine fraction is from about 3:1 to about 30:1.

16. The process of claim 1 wherein the pH of the leach solution is from about 2 to about 3.

17. The process of claim 3 wherein a ratio by weight of leach solution to coarse fraction in the second leaching zone is from about 1.5:1 to about 10:1.

18. The process of claim 17 wherein the ratio by weight of leach solution to coarse fraction is from about 2:1 to about 3:1.

19. The process of claim 15 wherein the ratio of 1 each solution to fine fraction is from about 10:1 to about 20:1.

20. The process of claim 15 wherein the pH of the leach solution is from about 2 to about 3.

21. The process of claim 3 wherein the pH of the leach solution is from about 2 to about 3.

22. The process of claim 1 wherein the fine fraction is washed with water and neutralized after separation from the leach solution.

* * * * *